(12) United States Patent  
Pasupuleti et al.

(10) Patent No.: US 12,111,828 B2  
(45) Date of Patent: Oct. 8, 2024

(54) METHOD AND SYSTEM TO IMPLEMENT ERROR HANDLING WITH FINE-GRAINED SQL HINTS

(71) Applicant: Oracle International Corporation, Redwood Shores, CA (US)

(72) Inventors: Krishna Kantikiran Pasupuleti, Belmont, CA (US); Mohamed Ziauddin, Pleasanton, CA (US); Hong Su, Belmont, CA (US); Sunil P. Chakkappen, Foster City, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 17/451,047

(22) Filed: Oct. 15, 2021

(65) Prior Publication Data

US 2023/0117461 A1    Apr. 20, 2023

(51) Int. Cl.
*G06F 16/24*        (2019.01)
*G06F 16/2453*      (2019.01)

(52) U.S. Cl.
CPC .............................. *G06F 16/2453* (2019.01)

(58) Field of Classification Search
CPC .................................................. G06F 16/2453
USPC ........................................................ 707/713
See application file for complete search history.

(56) References Cited

U.S. PATENT DOCUMENTS

| | | | |
|---|---|---|---|
| 10,754,974 B2* | 8/2020 | Hentschel | G06F 21/6218 |
| 2004/0153435 A1* | 8/2004 | Gudbjartsson | G06F 16/284 |
| 2008/0177694 A1* | 7/2008 | Chaudhuri | G06F 16/24542 |
| 2022/0292197 A1* | 9/2022 | Bandaru | G06F 21/6218 |

FOREIGN PATENT DOCUMENTS

| | | | | | |
|---|---|---|---|---|---|
| RU | 2015106007 A | * | 9/2016 | | G06Q 10/06 |
| WO | WO-9748039 A1 | * | 12/1997 | | G06F 17/30607 |

OTHER PUBLICATIONS

"Lecture #3: Advanced Database Systems," Carnegie Mellon University, Query Compliation, dated 2018.
"Overview of the SQL Compiler," IBM Administration Guide, date found via Internet Archive as Feb. 26, 2022.
Pollack, E., "Query optimization techniques in SQL Server: the basics," SQLShack, URL: https://www.sqlshack.com/query-optimization-techniques-in-sql-server-the-basics/, dated May 30, 2018.
"8.9.3 Optimizer Hints," MySQL, URL: https://dev.mysql.com/doc/refman/8.0/en/optimizer-hints.html, date found via Internet Archive as Oct. 22, 2021.

(Continued)

*Primary Examiner* — Syling Yen
(74) *Attorney, Agent, or Firm* — Vista IP Law Group, LLP

(57) ABSTRACT

Disclosed is an approach for applying fine-grained hints to obtain optimal control over error handling during query compilation. Using fine-grained hints causes less disruption to the query plans generated by the optimizer as they constrain specific features while retaining scope for the rest of the optimizer functionality. This approach provides a query plan of better quality that avoid errors, particularly in comparison to coarse-grained approaches that restrict processing to earlier database versions or which disables cost-based processing.

30 Claims, 14 Drawing Sheets

(56) References Cited

OTHER PUBLICATIONS

Fritchey, G., "Controlling Execution Plans with Hints," Redgate, Nov. 12, 2009.
Biradar, B., "Exception Handling in Sql Server," SqlHints.com, dated Jan. 20, 2014.
Hinsperger, J., "From the Archives—Customizing SQL Requests With Hints—Part Deux," SAP Community, dated Apr. 2, 2014.
Dieter, D., "SQL Server Hints Explained," SQL Server Planet, dated Aug. 6, 2015.
Bayliss, N. "Adding and Disabling Hints Using SQL Patch," Oracle Optimizer, dated Jan. 1, 2020.
Colgan, M., "Using SQL Patch to add hints to a packaged application," Oracle Optimizer, dated Feb. 27, 2020.
Jardot, N., "SQL Patch: Another way to change the plan without changing the code," dbi Services, dated Mar. 10, 2014.
Lewis , J., "sql_patch," Oracle Scratchpad, dated Aug. 21, 2019.
Pachaly-Mischke, M., "SQL Patches—what hints do they exactly use?," dbamarco.wordpress.com, dated Nov. 9, 2015.

\* cited by examiner

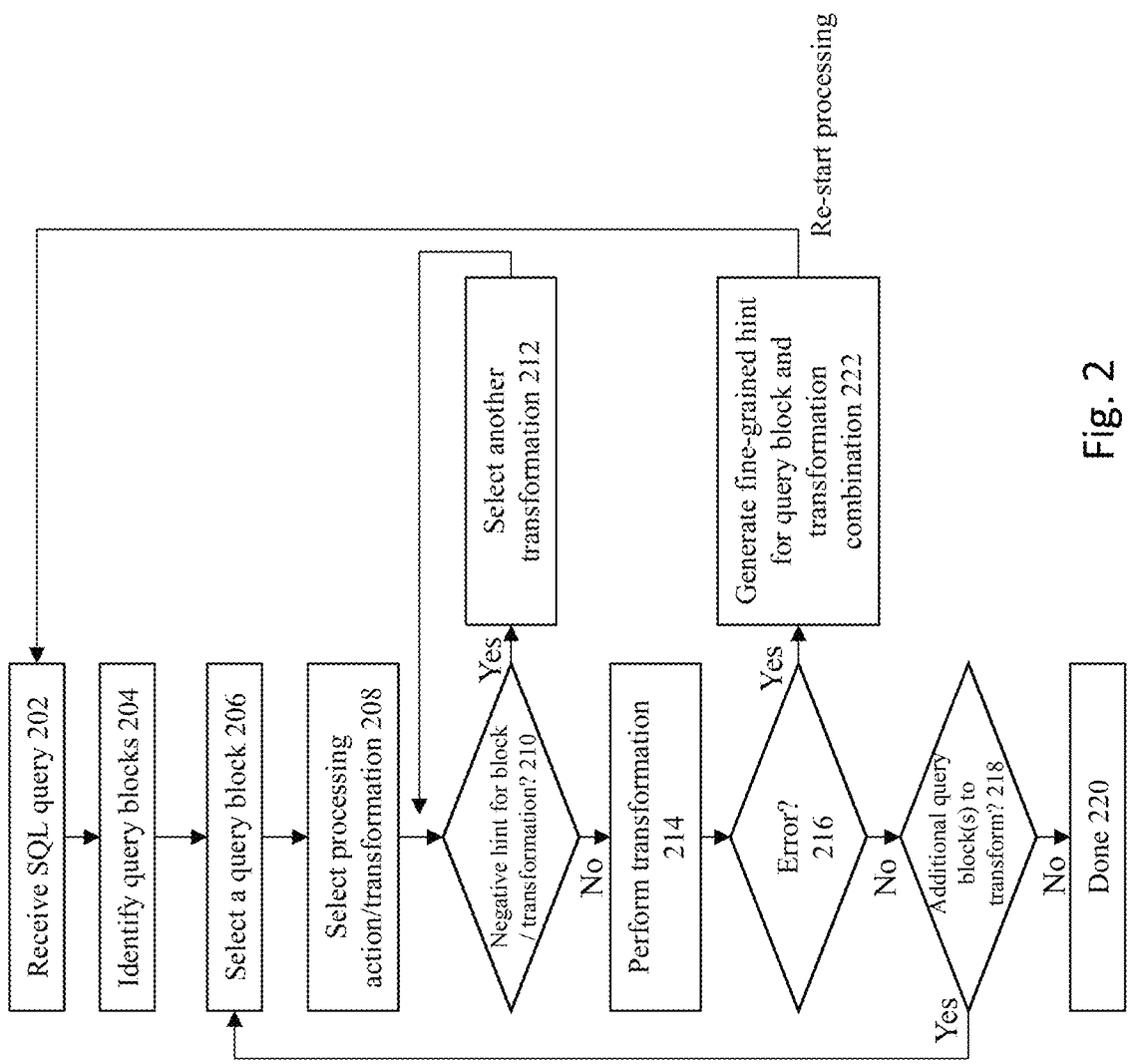

```
SEL$1  SELECT *
       FROM t_10k f, t_5k d1, t_5k d2, t_5k d3,
            (SELECT * FROM t_5k d4 WHERE unique2 in (1,3,5)) v
       WHERE f.ten = d1.ten
SEL$2    AND d1.ten = d2.hundred
         AND d3.unique1 in (1,2)
         AND f.hundred = d3.hundred
         AND d3.unique3 = 5
         AND f.thousand = v.thousand
         AND v.unique2 in (3,5,7)
         AND EXISTS (SELECT 1 FROM t_4k t4 WHERE t4.unique1 =
                     f.unique2);
                              SEL$3
```

```
SELECT SUM(T3.y)
FROM T1, T2, T3, T4
WHERE T1.j = T2.j
    and T2.x = T3.x
    and T1.y = T3.y
    and T4.z = T1.z
    and T2.b > 2
GROUP BY T1.g;
```
502

| {T1 T2 T4} | C | F |
|---|---|---|
| {1 1 1} | {T1, T2, T3, T4} | ∅ |
| {1 1 0} | {T1, T2, T3} | {T4} |
| {0 1 1} | {T2, T3, T4} | {T1} |
| {0 1 0} | {T2, T3} | {T1, T4} |
| {1 0 1} | {T1, T3, T4} | {T2} |
| {1 0 0} | {T1, T3} | {T2, T4} |
| {0 0 1} | {T3, T4} | {T1, T2} |
| {0 0 0} | {T3} | {T1, T2, T4} |

Fig. 5B

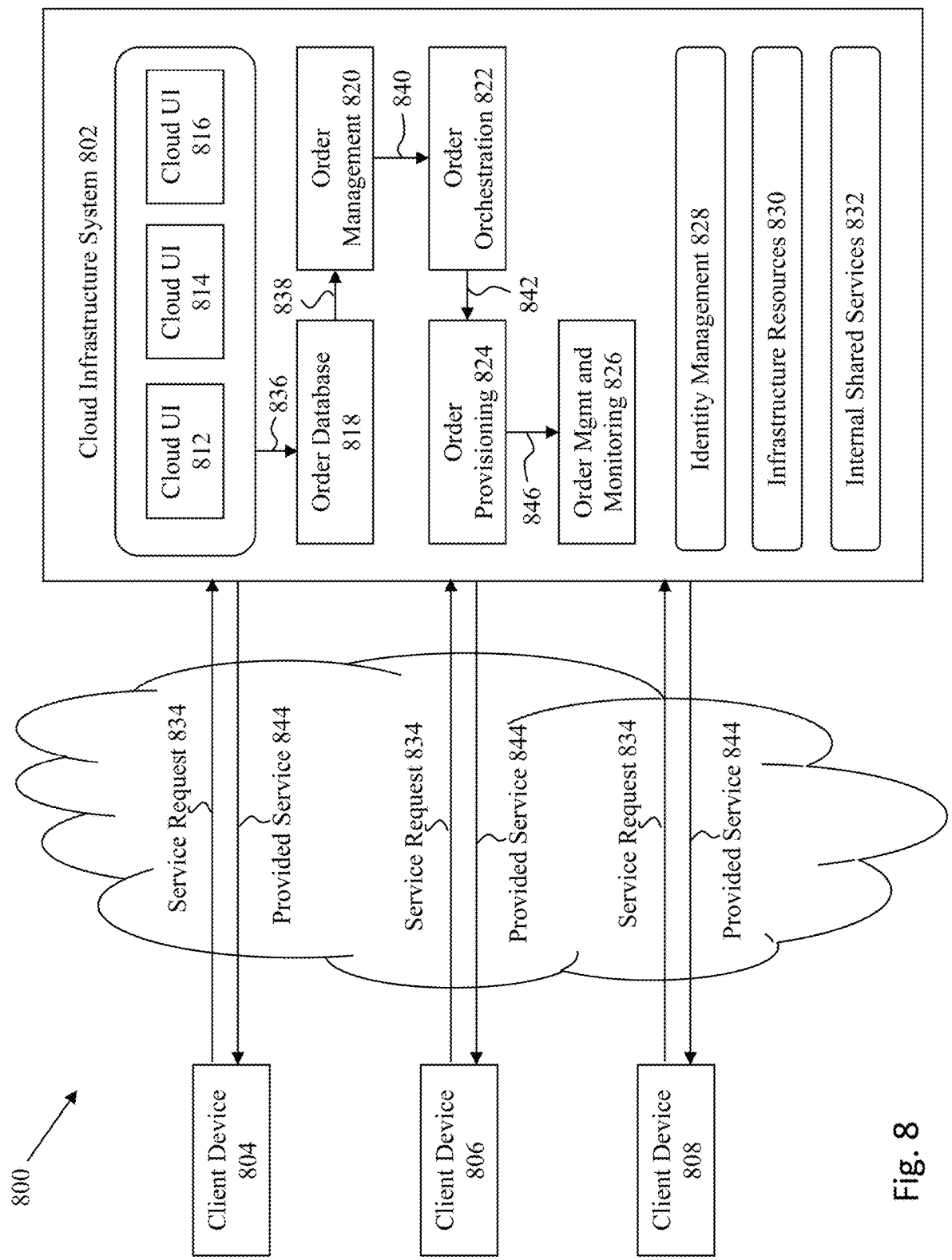

METHOD AND SYSTEM TO IMPLEMENT ERROR HANDLING WITH FINE-GRAINED SQL HINTS

BACKGROUND

Interactions typically occur with a database by submission of commands that cause the database to perform operations on database data. For the database server to process the commands, the commands typically conform to a database language supported by the database server. An example of a commonly used database language supported by many database servers is known as the Structured Query Language (SQL).

When a database server receives the database command (e.g., from a database application), the database server must first determine which actions should be performed in response to the database command, and then perform those actions. A query processor may process the database statement to prepare the acts necessary for performance of the desired actions within the database. The initial action to analyze and break the database statement into its constituent parts may be referred to as "parsing" the database command. "Compilation" of the database command may then be performed to create the specific composition and sequence of actions to take against delineated set(s) of database objects, as well as code generation that may be necessary to create an executable version of the database statement. Since there may be multiple alternative processing paths that can be taken to achieve the same result within a database, "optimization" may be performed to identify specific processing paths that can be selected to improve the efficiency of processing for the database command. The actual performance of the actions applied to the database is generally referred to as "executing" the database command.

It is relatively common for errors to be encountered during query processing that will prevent the query from properly being compiled. Any such errors that occur during the compilation process will most likely not allow the system to produce correctly operable code.

Identifying and resolving errors during compilation is a very difficult exercise in many database systems. If the errors are not adequately addressed, then they may become recurring errors that haunt multiple iterations of the compilation process, thereby resulting in many inefficient and wasteful cycles of compilation that could otherwise had been avoided if the error had been dealt with adequately in a previous compilation cycle. However, to ensure that such errors are resolved and do not appear again, some systems may apply burdensome solutions where advanced optimization options are completely removed from the next compilation cycle, thereby resulting in possibly sub-optimal and inefficient execution plans.

What is needed, therefore, is a method and/or system that overcomes these problems, and which efficiently addresses errors that may be encountered during compilation of database statements.

SUMMARY

Embodiments of the present invention provide a system, method, and computer program product of an approach to apply fine-grained "hints" to obtain optimal control over error handling during query compilation. In some embodiments, negative hints are provided that are specific to a given query block and transformation.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 2 illustrates a process flow to implement some embodiments of the invention.

FIGS. 3A-D provide an illustrative example according to some embodiments of the invention.

FIGS. 5A-D provide an illustrative example of the approach for using state-based hints according to some embodiments of the invention.

FIG. 8 is a block diagram of one or more components of a system environment in which services may be offered as cloud services, in accordance with an embodiment of the present invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
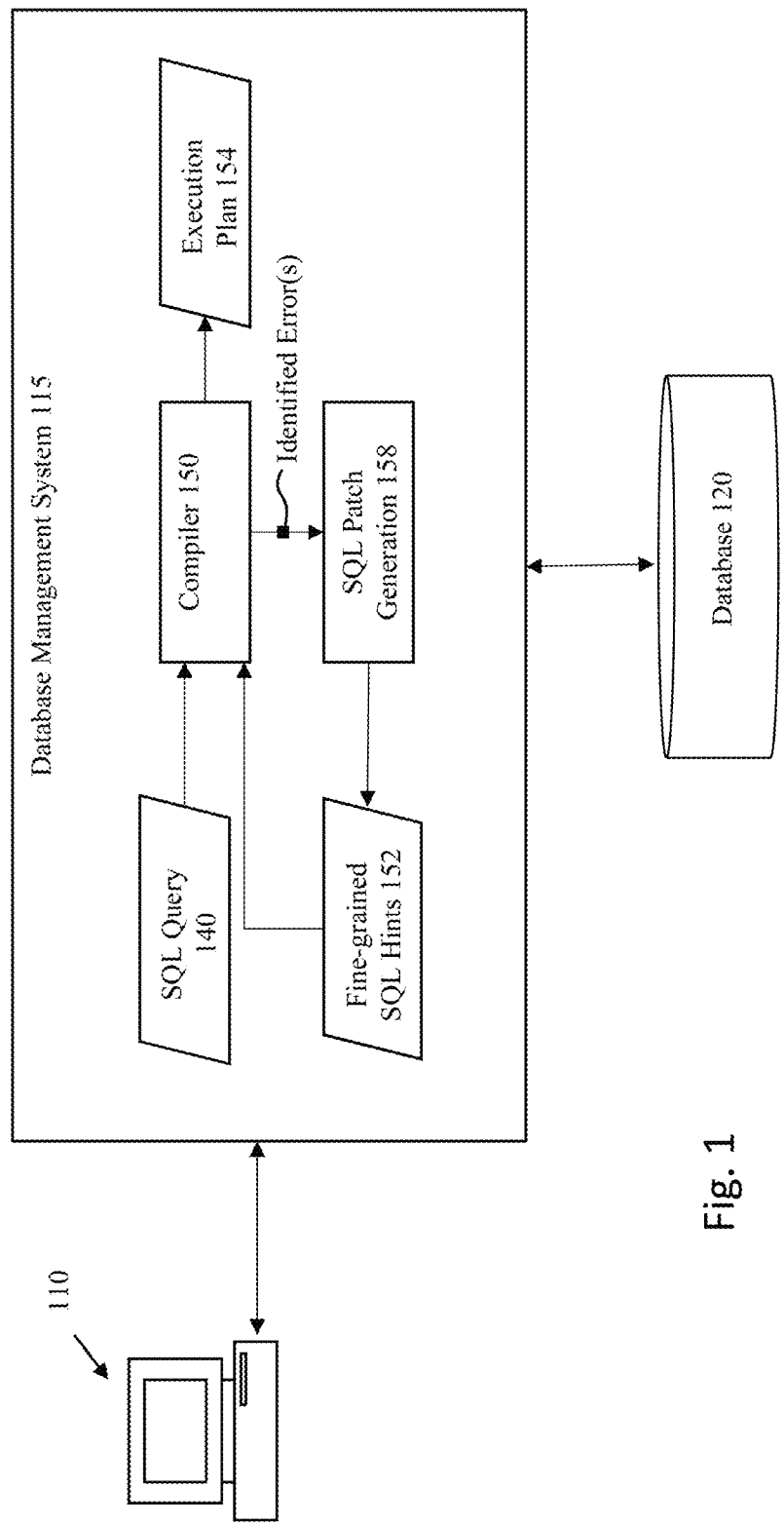
FIG. 1 illustrates a high-level diagram an embodiment of the invention.

FIG. 1 illustrates a high-level diagram an embodiment of the invention, describing a system, method, and computer program product of an approach to apply fine-grained "hints" to obtain optimal control over error handling during query compilation in a database system.

The database system may include one or more users or database applications within the system that operate from or using a user station 110 to issue commands to be processed by database management system (DBMS) 115 upon one or more database tables in a database 120. The user stations and/or the servers that host or operate with the database comprises any type of computing device that may be used to implement, operate, or interface with the database. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs. The database system may be communicatively coupled to a storage apparatus (e.g., a storage subsystem or appliance) over a network. The storage apparatus comprises any storage device that may be employed by the database system to hold storage content.

A database application or user may interact with the database system by submitting commands that cause the database system to perform operations on data stored that is stored in the database. The commands typically conform to a database language supported by the database server. As previously noted, a common example of a database language supported by many database servers is known as the Structured Query Language (SQL). When a database server receives the original statement of a database command from a database application, the database server must first determine which actions should be performed in response to the database command, and then perform those actions. The act of preparing for and/or determining for performance of those actions is generally referred to as compiling the database command, while performing those actions is generally referred to as executing the database command. A database "transaction" corresponds to an all or nothing unit of activity performed at the database that may include any number of different statements or commands for execution.

One or more SQL queries 140 may be received for processing by the DBMS 115. Each SQL query 140 may include one or more query blocks within the query, where each of the query blocks comprise a basic unit of execution within the query. A simple query may have only a single query block, while a complex query having multiple inline views or subqueries may possess multiple query blocks.

When compiling the SQL query 140, a compiler 150 within a query optimizer will consider the various query blocks within the SQL query 140, and determine how best to process the different query blocks to generate an execution plan 154. An execution plan 154 is a series of execution steps that are used by the database system to obtain a result set from operation of the SQL query. The execution steps will process according to an execution flow that considers, for example and without limitation, which tables will be accessed to satisfy the query, the order in which tables are accessed, the mechanism by which the table will be accessed (e.g., using an index or tablescan), the specifics of any join mechanisms, transformations to be applied to the various query blocks, and/or the method of application for predicates.

The compiler 150 is used to analyze the specific statements within the SQL query 140, and to project the set and order of execution steps within the execution plan. The compiler may consider various factors in its processing, including factors such as cost, time, rows, and data volume. The cost parameter pertains to a prediction of the amount of resources required for execution of a given operation for the query, including resources required for execution of descendent operations. These costs may be expressed, for example, as a unit or percentage of a resource (e.g., a CPU percentage for a CPU resource). The time parameter pertains to a predicted elapsed time period for execution of an operation. The row parameter pertains to a prediction of a number of rows needed to be supplied for execution of an operation. The data volume parameter pertains to an amount of predicted data supplied for execution of an operation (e.g., in terms of bytes based upon number of rows times the row size).

The issue addressed by this disclosure is that the compiler may encounter one or more errors when compiling the SQL query. For example, during the compilation process, the compiler may have different choices for transformations that may be applied to a query block within the SQL query, and the wrong choice of a transformation for the query block may cause an error to occur during processing and/or execution of the query.

When an error is detected during compilation, it is important for the error to be adequately addressed by the database system before the query is recompiled again, since if the error is not addressed, then any subsequent recompilations of the query may simply repeat the same choices that caused the error in the first place.

One possible approach that can be taken to address the error is to apply coarse-grained hints for subsequent compilation cycles. The coarse-grained hints are used by the compiler to avoid taking steps that would result in the identified errors. For example, one possible coarse-grained approach is to force the query optimizer to operate as an earlier version of the database system. This approach may be implemented, for example, by altering the value of a parameter such as "optimizer features enable" (OFE), where the OFE value corresponds to the release version of the database and tracks all features and capabilities of the query optimizer. When the value is modified to an older version, all the new features of query optimizer that are introduced after that version are automatically disabled. In effect the OFE value determines the "version" of the query optimizer that is used to compile the SQL statement. When the optimizer uses an OFE hint, it overrides the current version of the optimizer to the value specified in the hint. The database system may try different OFE values starting from the latest to oldest and compiles the SQL statement with each of them until the error is successfully avoided, e.g., where the largest OFE value is used that does not result in a compilation error. Another possible coarse-grained approach is to use a negative hint to disable the cost-based query transformation (CBQT) capability of the query optimizer. If the error disappears, the corresponding hint is added to a set of hints that is generated for the SQL statement. This parameter disables the logical query transformation capabilities of the optimizer completely.

The main problem with the approach of using coarse-grained hints is that these solutions may address the error but in such a draconian manner that they "over-correct" and may result in less-than-optimal execution plans. For example, the OFE approach may cause the database to operate using a much-earlier version of the database that lacks modern features, and thus results in an execution plan that uses sub-optimal processing techniques. The CBQT approach turns off all cost-based transformations, and this may result in execution plans that cause higher relative execution costs for processing the query. Therefore, the coarse-grained hints disable a large fraction of optimizer capability in order to avoid errors, and while the plans generated in this manner may avoid the errors, they can also be quite sub-optimal.

To address these problems, embodiments of the invention provide an approach to implement fine-grained hints 152 for the compiler, where the fine-grained hints are precisely targeted only to specific query blocks within the SQL query. Each fine-grained hint identifies a specific query block and transformation combination. Only the specifically targeted query blocks in the fine-grained hints are prevented from being used, in a directed manner, with an identified transformation approach.

As such, this approach allows the compiler to continue using all existing features of modern database systems for portions of the query that did not previously exhibit an error, which is particularly advantageous over the OFE and CBQT approaches. However, for the targeted query blocks in the fine-grained hints, these hints will serve to prevent a previously-encountered error from happening again in any subsequent compilations of the query.

The inventive approach of using fine-grained hints therefore provides a solution that can be used to avoid errors during compilation, while also doing so in a manner that minimizes impact to overall query performance.

In some embodiments, a "SQL patch" is used as a vehicle to provide the hint to the optimizer/compiler. In this context, a hint is a directive to the query optimizer that the optimizer is obliged to follow during query compilation. If a hint is valid both syntactically and semantically it should be honored by the optimizer. The SQL patch is an object that may be located and persisted within the database's data dictionary as an object (e.g., as a "SQL plan management object"). The SQL patch is a mechanism used by certain databases (e.g., database products provided by Oracle Corporation) to address and/or avoid errors encountered during query processing that prevent query compilation/execution from proceeding. They can also be used to address performance issues and wrong results during query execution. The patches comprise a set of hints which when applied steer the query optimizer away from erroneous code paths thus avoiding errors during compilation. This document describes a mechanism to generate SQL Patches that operate at a finer level and do not alter query plans significantly thus retaining most of the features of the optimizer. The mechanism can be applied for errors that are raised during the logical transformation phase of queries. As shown in FIG. 1, a SQL path generation module 158 may be used to generate and/or maintain the fine-grained hints 152.

FIG. 2 illustrates a process flow to implement some embodiments of the invention. At 202, a SQL query is received. It is noted that the present embodiment is described illustratively with respect to SQL queries, but the inventive concepts described herein are applicable to other types of queries or database query languages as well. Therefore, the scope of the invention is not to be limited only to "SQL" queries unless claimed as such.

At 204, one or more query blocks are identified within the SQL query. Each SQL query may include one or more query blocks within the query, where each of the query blocks comprise a basic unit of execution within the query. In general, any inline view or subquery of the SQL query corresponds to a separate query block. The query blocks may be named using keywords based upon the type of query block being named. For example, a query block corresponding to a SELECT statement may be associated with a "SEL$_" name, where a first SELECT query block is named as "SEL$1" and a second SELECT query block is named as "SEL$2".

In some embodiments, the query block corresponds to a unit of optimization within the query. In other words, it is at the granularity level of the query block in which a specific action can be applied to optimize processing for the query. Therefore, specific keywords in the query associated with the individual query blocks (e.g., SELECT, INSERT, UPDATE, DELETE, or MERGE) can be associated with hints to optimize the compilation process for the query.

At 206, a query block from among the one or more identified query blocks is selected for processing. Any suitable ordering for selection for the query blocks may be used. In one embodiment, the query blocks are selected for processing in the order in which they appear or are identified within the query, e.g., query block SEL$1 is processed ahead of query block SEL$2.

At 208, a specific processing action is selected for the query block, e.g., where a specific type of transformation is selected for application to the query block. A "transformation" is a specific technique or set of techniques used by the database optimizer to rewrite the query/query portion to a semantically equivalent query or query portion to improve query performance (e.g., where semantically equivalence in the database context corresponds to the production of the same query result set). There are multiple types of transformations that may be used in a database system. The following is a non-exclusive list of example transformations: (a) "OR Expansion", where the optimizer transforms a query with a WHERE clause containing OR operators into a query that uses the UNION ALL operator, e.g., so that more efficient access paths or alternative join methods are provided that avoid Cartesian products.; (b) "View Merging", where the optimizer merges the query block representing a view into the query block that contains it, e.g., where view merging can improve plans by enabling the optimizer to consider additional join orders, access methods, and other transformations; (c) "Predicate Pushing", where the optimizer "pushes" the relevant predicates from the containing query block into the view query block, e.g., where for views that are not merged, this technique improves the subplan of the unmerged view because the database can use the pushed-in predicates to access indexes or to use as filters; (d) "Subquery Unnesting", where the optimizer transforms a nested query into an equivalent join statement, and then optimizes the join, e.g., where this transformation allows the optimizer to consider the subquery tables during access path, join method, and join order selection; (e) "Query Rewrite with Materialized Views", where when the optimizer finds a user query compatible with the query associated with a materialized view, then the database can rewrite the query in terms of the materialized view, e.g., where this technique improves query execution because the database has precomputed most of the query result; (f) "Star Transformation", where the optimizer avoids full table scans of fact tables in a star schema; (g) "In-Memory Aggregation", where aggregation is performed while scanning to optimize query blocks, e.g., involving aggregation and joins from a single large table to multiple small tables, such as in a typical star query, where the transformation uses KEY VECTOR and VECTOR GROUP BY operations, since these operations use efficient in-memory arrays for joins and aggregation and are especially effective when the underlying tables are in-memory columnar tables; (h) "Table Expansion", where the optimizer generates a plan that uses indexes on the read-mostly portion of a partitioned table, but not on the active portion of the table, which is premised upon the fact that index-based plans can improve performance, but index maintenance creates overhead and as such, in many databases DML affects only a small portion of the data—which means that table expansion can use index-based plans for high-update tables where an index is created only on the read-mostly data, eliminating index overhead on the active data to allow table expansion to improve performance while avoiding index maintenance; and/or (i) "Join Factorization", where the optimizer can factorize common computations from branches of a UNION ALL query, where since branches in a UNION ALL query often refer to the same base tables, then without join factorization, the optimizer evaluates each branch of a UNION ALL query independently, which leads to repetitive processing, including data access and joins—therefore, join factorization transformation can share common computations across the UNION ALL branches thus avoiding an extra scan of a large base table and thus leading to a performance improvement.

A determination is made at 210 whether a negative hint already exists for the selected combination of the query block and the transformation. The negative hint may have been created during a prior compilation iteration based upon an error that was detected for this specific block/transformation combination. If so, then at 212, another transformation selected.

At 214, the selected transformation is applied to the query block. A determination is made at 216 whether an error has occurred based at least in part or whole for the transformation of the query block. Any suitable class of error may be identified with respect to step 216. For example, an "assertion error" is a type of error that may occur due to an inappropriate type of transformation applied to a query block. An assertion is a statement that allows one to test an assumption, and the assertion error is an error indicating that an assertion has failed, where an unexpected condition is identified that is not recoverable (e.g., regarding an assertion for the existence of a given index or access path).

When an error occurs during a query transformation in some embodiments, a SQL Patch is generated at 222 that avoids the particular transformation by generating an appropriate negative hint. Such errors include errors raised by the physical optimizer code as well (for example when transformation states are costed using physical optimizer APIs).

At this point, since an error has occurred, the compilation process exits, and may return back to 202 to restart the compilation process again—although the next iteration will now include a negative hint for the specific query block/transformation combination that caused the previous error.

If, however, an error was not detected at 216, then the transformation was likely considered successful, and the processing continues to 218 to determine whether there are any further query blocks to process. If so, then the processing returns back to 206 to select another query block to process. If there are no further query blocks to process, then the current processing ends at 220.

Figure 3B:
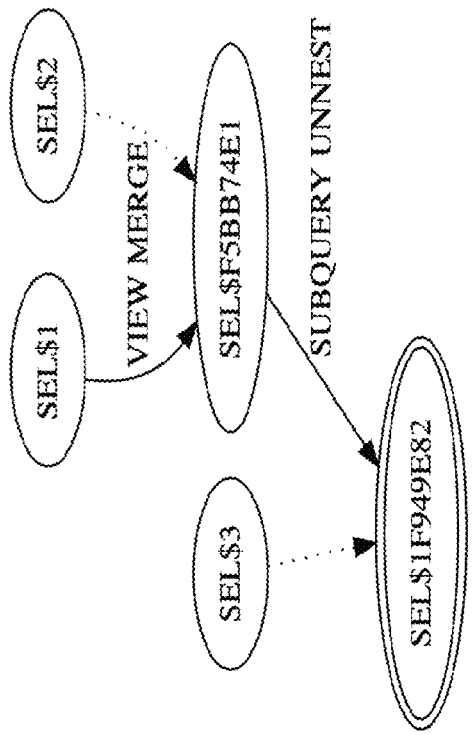

FIGS. 3A-D provide an illustrative example according to some embodiments of the invention. FIG. 3A shows an example SQL query 302. This example query 302 includes three query blocks, including query blocks SEL$1, SEL$2, and SEL$3. Query block SEL$1 corresponds to the outer SELECT statement, and SEL$2 and SEL3 correspond to subqueries that are located within the outer SELECT statement.

When query 302 is compiled, a cost-based query optimizer may apply a number of logical transformations in an attempt to arrive at an equivalent but more efficient query form. Such transformations are applied in a specific order. For example, in query 302, view 'v' can be merged into its outer query block while the subquery specified in 'v' can be unnested converting it into a semi-join.

A graphical representation of the query blocks and their respective illustrative transformations are shown in FIG. 3B. It is noted that query transformations generate new names for query blocks as they apply some "material" changes to the structure of the query. For example, subquery unnesting would rename both the subquery and the outer query block to mark the changes that these query blocks undergo as part of unnesting. The new names are generated using a hash function that works on the current names and other transformation related parameters. Thus the query block names are unique. As current names of the query blocks are in turn based on prior transformations that were applied on them the names at any point in time, represent a "summary" of all prior operations performed on them in a specific order. It is necessary that for the same name to be generated in another instance of compilation, the same series of transformations are applied in the same order.

The hash function that is used to generate the new query block name when a transformation is applied (during the first compilation as well as subsequent re-compilations) uses all the inputs that are relevant for the operation. These inputs can be other query block names, table names and any other information that is relevant to the structure of the query block that is being modified. As a consequence, during re-compilations if the transformation is applied in the same way using the same inputs (query blocks, tables etc.), the hash function would produce the same name again. In other words it is deterministic and has both the following properties: (a) If all the inputs to the hash function are the same, the output name is identical; (b) If any of the inputs to the hash function are different, the output name is different.

The query block names can be viewed as a series of hash values that are generated for a query block based on the operations performed on them. The set of names generated for a SQL statement are captured and represented as a graph as shown in FIG. 3B. The query block names SEL$1, SEL$2 and SEL$3 correspond to the three query blocks in the original query. When the transformation "view-merging" is applied on SEL$2 and it is merged into SEL$1, the corresponding edges in the query block (QB) graph are created and the query block SEL$1 is renamed to SEL$F5BB74E1. Similarly when query block SEL$3 is unnested into SEL$F5BB74E1, its name is modified to SEL$1F949E82.

The transformations therefore result in new query blocks that are deterministically associated with new and unique query block names. As previously noted, the view merge transformation with respect to query blocks SEL$1/SEL$2 results in a new query block that is named in a determinative way as SEL$F5BB74E1, which results from a hash function that takes the specific parameters of the transformation and its inputs to create the new query block name.

Figure 3C:
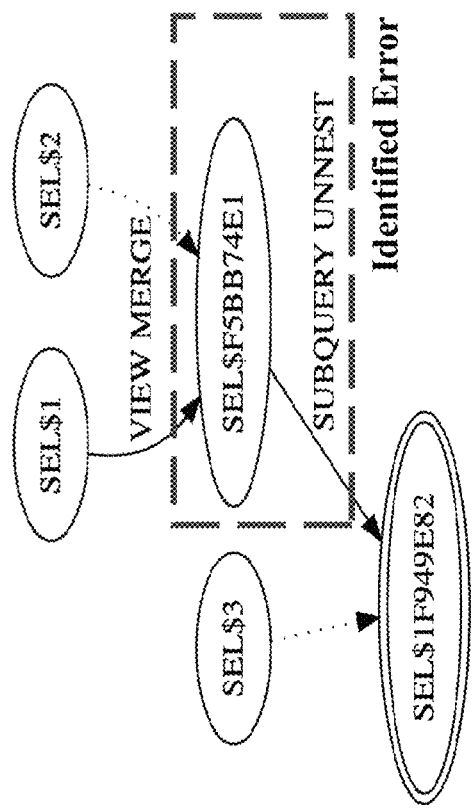

It is possible that an error is identified during the compilation process for a specific combination of a query block and transformation. As illustrated in FIG. 3C, consider if an error is detected for the "Subquery Unnest" transformation that is applied to the "SEL$F5BB74E1" query block. If an error is encountered during subquery unnesting for this query block, then the compilation may fail.

According to the current embodiment of the invention, when an error is caught in the query transformation phase, a negative hint for the transformation is generated on the name of the query block at that point. The negative hint thus is "conditional", disabling the transformation on that particular query block name. This is a desirable result because if in another instance of compilation, the query block name happens to differ (because one or more prior transformations did not take place in the same way) the negative hint would be ineffective in disabling the transformation. The justification is that the query block differs in its structure (by virtue of having a different name), and therefore it is possible the code path of the transformation is no longer faulty and hence continuing to apply the transformation is preferred.

Figure 3D:
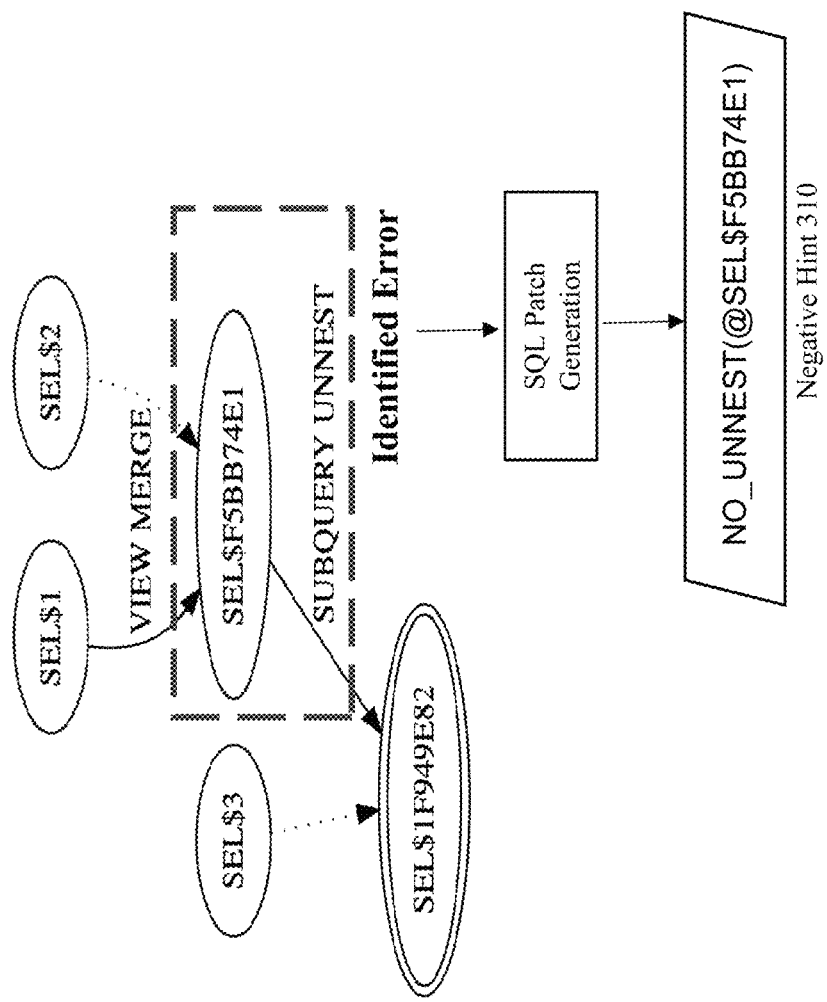

In the current illustrative example as shown in FIG. 3D, when an error is encountered during subquery unnesting, a negative hint NO_UNNEST(@SEL$F5BB74E1) is generated and added to the SQL Patch. The query block name SEL$F5BB74E1 captures the essence of prior transformations on the query block (here, view-merging). The negative hint is effective only if the query block SEL$F5BB74E1 is generated and not otherwise. This is similar to stating, "if all the prior operations happened on the query block exactly in the same way when the error was initially encountered during subquery unnesting, disable the transformation on the query block". It is very likely that the error encountered by the query compiler originally is due to the structure of the query block (including its tables, views etc.) that exists at the time. Hence a SQL Patch that prevents the same transformation from being attempted on the same query block structure will likely prevent the error, and at the same time leaves room for the rest of the transformations as well the faulty transformation to be applied on other query blocks. Such fine-grained error control retains the scope for most of the optimizer features to be applicable resulting in efficient plans.

In an alternative embodiment, for some transformations, it is possible to generate a negative hint that disables specific "states" of a transformation rather than the entire transformation itself on a query block name. This approach provides a lower level of granularity for the negative hint as compared to the approach of disabling the entire transformation for the query block.

Figure 4:
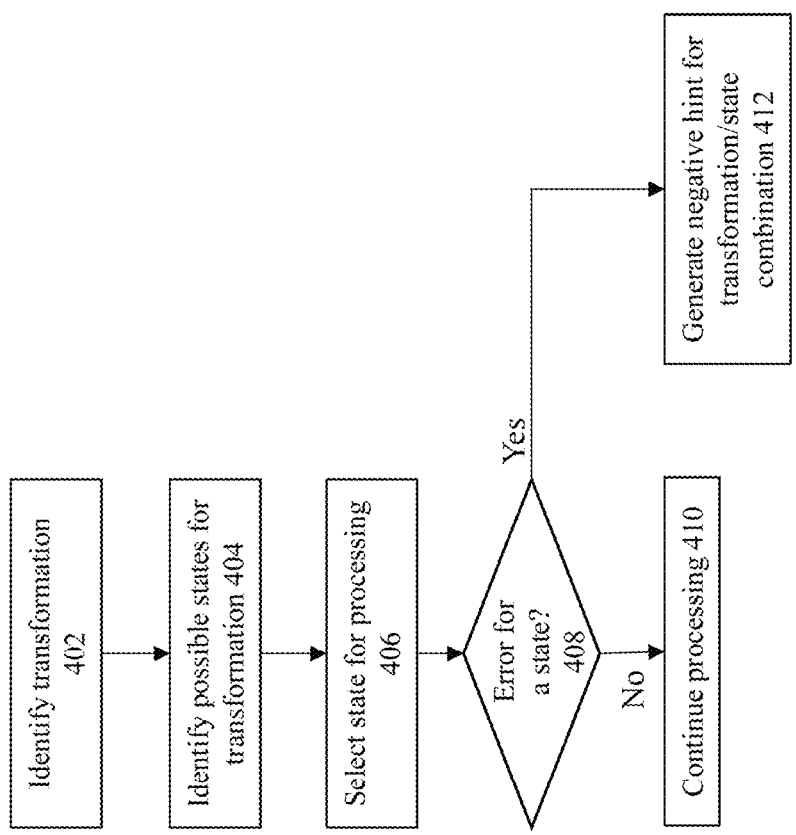
FIG. 4 illustrates a process flow to implement some embodiments of the invention where the negative hint is applicable to a particular state with respect to a transformation.

FIG. 4 illustrates a process flow to implement some embodiments of the invention where the negative hint is applicable to a particular state with respect to a transformation. At 402, a transformation is identified for a query block.

At 404, possible states are identified for the transformation. The concept of a state for this embodiment pertains to any condition or permutation of conditions for which the transformation may be alternatively processed. For example, a Group-by placement transformation hint specified as PLACE_GROUP_BY(@SEL$ABC (X Y) (Z)) indicates that tables X,Y should be together in one group-by view and table Z should be placed in another group-by view. An alternative state for this transformation PLACE_GROUP_BY(@SEL$ABC (X) (Y Z)) may place X in one group-by view and Y,Z in another group-by view.

At 406, a particular state may be selected for processing. Any suitable approach may be used to select a state for processing. For example, a cost-based approach may be used to select a state for processing.

At 408, a determination is made whether an error has occurred during compilation for the selected state of the transformation. If not, then normal processing continues at 410. However, if an error occurs, then at 412, a negative hint is generated for the specific state of the transformation that corresponds to the error.

For example, for a group-by placement transformation, if an error occurs during the transformation in a particular state s1, a negative hint using a similar syntax can be created that disables a set of states that share the characteristic as s1. As another example, if an error occurs while creating a group-by view with table X in it, a hint NO_PLACE_GROUP_BY (@SEL$ABC (X)) is created that disables Group-by placement states in which the table X is placed in a group-by view. However other states of the transformation like s2: (Y) (Z) where tables Y and Z are placed in group-by views or s3: (X Y) (Z) where tables X and Y are placed in one view and table Z in another view, are valid candidates and are not ignored due to the hint.

Figure 5C:

FIGS. 5A-D provide an illustrative example of the approach for using state-based hints according to some embodiments of the invention. FIG. 5A shows a query 502 in the context of Group-By placement (GBP) transformation. The GBP transformation operates by costing multiple states for the query block, and by choosing the cheapest of them. For an exhaustive search strategy, all possible states may be explored, and the GBP transformation may then create one or two group-by views for the query block with a set of tables in each view. The views are identified as coalesced view or factored view according to whether they contain the aggregated tables or not.

The table 504 in FIG. 5B shows a sample set of states explored by a GBP transformation for the query 502 of FIG. 5A. In this table, "C" represents the coalesced-table set and "F" represents the factored-table set. It is noted that a set of conditions exists that govern the validity of states explored which is specific to each transformation and is not elaborated in this document. As the aggregate of the query is present on table T3, it is mandatory to include it in the set C, and hence is not shown in the state space. The rest of the tables T1, T2 and T4 can be placed in either coalesced view or factored view and used to generate various possible combinations.

As shown in FIG. 5C, consider if the query block's current name is SEL$XYZ and an error is encountered while GBP is exploring a state in which the first view is over tables (T1 T3) and the second view is on tables (T2 T4).

Figure 5D:
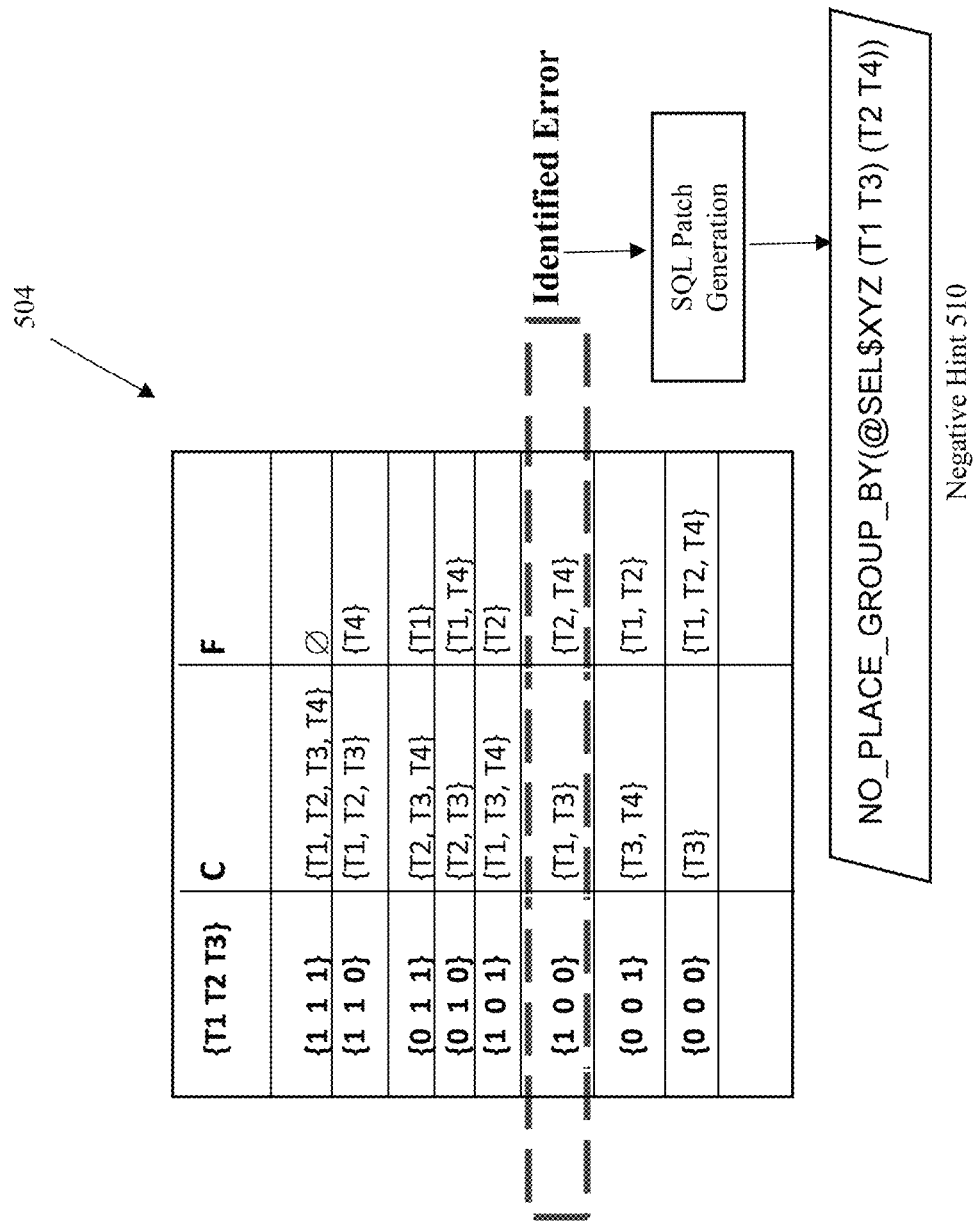

As shown in FIG. 5D, a negative hint can be generated in the SQL Patch as follows: NO_PLACE_GROUP_BY (@SEL$XYZ (T1 T3) (T2 T4)). This hint corresponds to the GBP transformation for the specific state of the first view on tables (T1 T3) and the second view on tables (T2 T4) for query block "SEL$XYZ". When the patch is used to compile the query again, the negative hint disables exploration of the particular state while retaining the rest of the capability of the query optimizer thus resulting in better plans.

Figure 6:
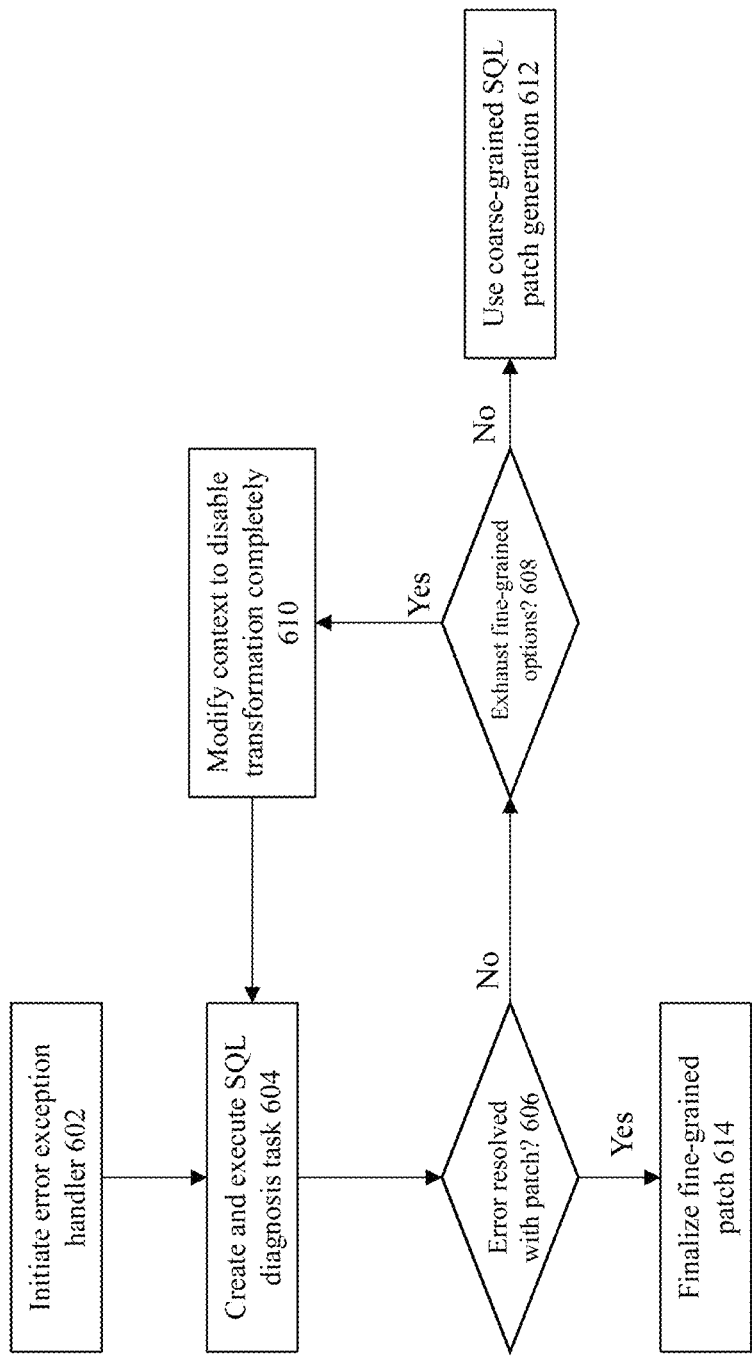
FIG. 6 illustrates a process flow according to some embodiments of the invention for generating a SQL patch.

FIG. 6 illustrates a process flow according to some embodiments of the invention for generating a SQL patch. The technique proposed in this section can be used during a manual SQL repair driven by the user or performed automatically when an error is encountered.

At 602, an exception handler is initialized before the optimizer attempts the query transformations. The error handler catches errors that are raised by the optimizer throughout the transformation phase. As optimizer proceeds through various query transformations, the information regarding current active transformation and the current active state of the transformation are maintained in process-global memory that is accessible in the exception handler. This extends to techniques such as interleaving and juxtaposing transformations where a new transformation is attempted and its cost is considered before a final decision is made regarding another transformation. When a new transformation is attempted, the current transformation in the context is updated accordingly. The current state description is transformation-specific and is used to re-construct the corresponding hint.

When an error is raised and control reaches the exception handler, the information in the context is used to generate an appropriate negative hint. At 604, the SQL patch generation process is then invoked with this information which creates and verifies a SQL patch for the SQL statement. The SQL patch is then persisted, e.g., as a SQL plan management object in the data dictionary. The nature of the negative hint produced depends on the transformation and the scope of its corresponding hint as described in prior given examples.

For instance, in a first iteration of this process, if the transformation whose hint can identify its specific states, the negative hint targeting the state is generated. Therefore, if it is determined at 606 that the error is resolvable with the SQL patch with a negative hint corresponding to a specific state, then this type of fine-grained patch is finalized at 614.

If a patch with the fine-grained hint having specific states does not resolve the error, then a determination is made at 608 whether there are any further fine-grained options. For example, another fine-grained hint option is to use a fine-grained hint without a specific state. If this second option is available, then at 610, another iteration is performed, and the context is modified to disable the transformation completely for the query block under examination (without correlating to a specific state). This approach, while possible effective to avoid errors involving the disabled transformation, may be less optimal as compared to the approach of using a fine-grained negative hint to disable the transformation only for a particular state for the query block. The step at 604 is repeated for the modified context, and another check is made at 606 if the error is resolved. If so, then this new version of the fine-grained patch is finalized at 614, where the entire transformation is disabled for a given query block. If the error is not resolved, then the process proceeds again to 608 to make a determination whether there are any further fine-grained options.

If there are no further fine-grained options (e.g., a previously-created fine-grained SQL patch already exists and the exception continues to occur), then at 612, a coarse-grain patch can be generated for the SQL statement. For example, the OFE and/or CBQT approaches may be employed to implement the coarse-grained SQL patch.

Therefore, what has been described is an improved approach to address compilation errors for database queries by using fine-grained hints. It can be appreciated that the current inventive approach of using fine-grained hints (e.g., for SQL patches) causes less disruption to the query plans generated by the optimizer as they constrain specific features while retaining scope for the rest of the optimizer functionality. The result is a query plan of better quality that avoid errors, particularly in comparison to coarse-grained approaches that restrict processing to earlier database versions or which disables cost-based processing.

The patches are also very effective in capturing the structural conditions under which the error must be targeted as they use query block names for negative hints. During re-compilation, such hints only apply to query blocks with specified names if and whenever they are generated. If the query block carries a different name because the change in environment or statistics cause optimizer to transform it in a different way, the query block differs in its physical structure and the patch will not be applicable to it. In such a situation the optimizer is not constrained which is a desirable outcome.

System Architecture Overview

Figure 7:
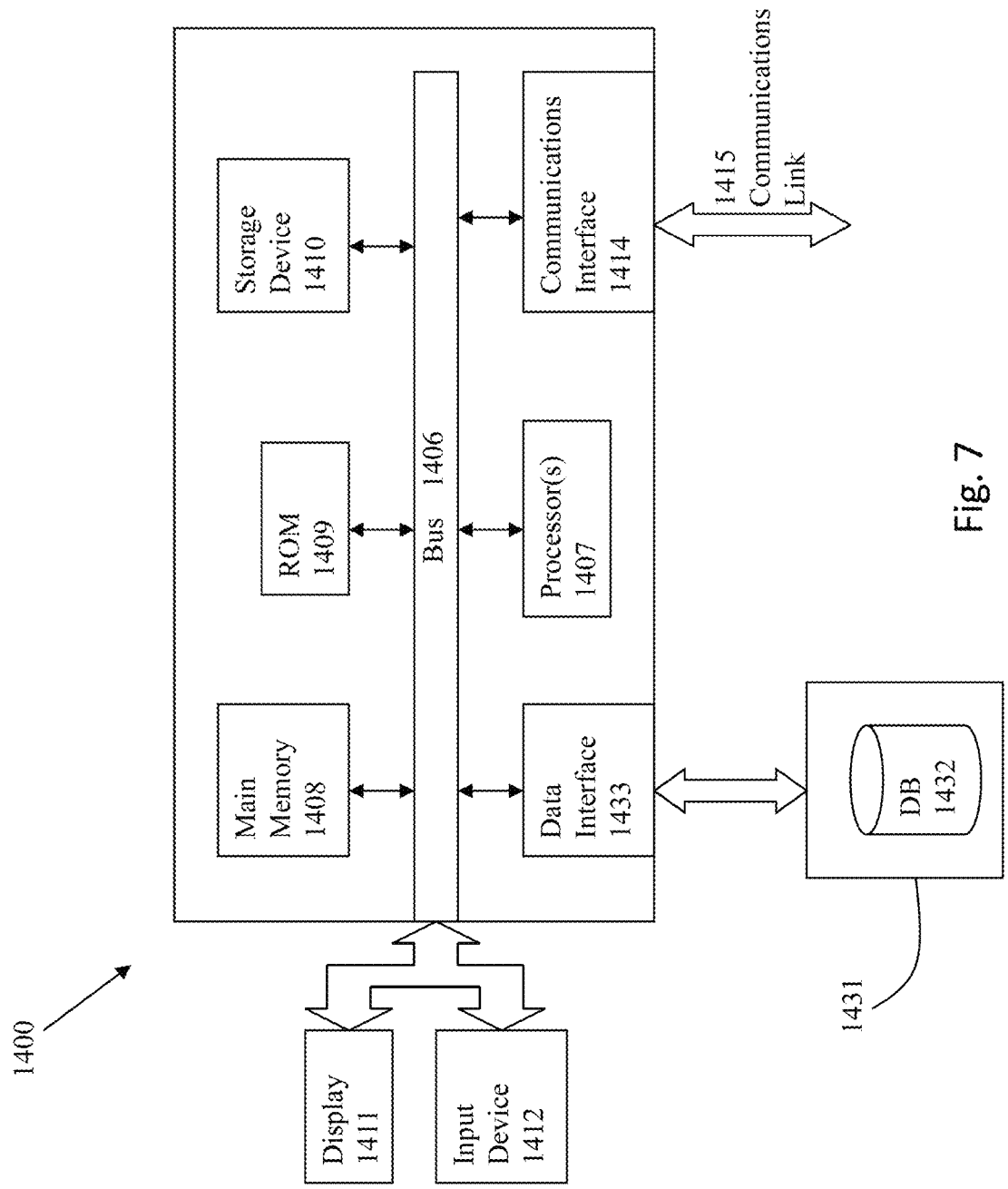
FIG. 7 is a block diagram of an illustrative computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to sub scribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
performing a compilation on a database query at a database server to transform at least a first query block and a second query block in the database query; and
in response to the compilation on the database query,
    detecting an error that occurred during the compilation of the database query;
    upon detection of the error, determining a transformation which, when applied to the second query block during the compilation, causes the database server to produce the error during the compilation;
    determining an identifier for the second query block that causes the error during the compilation;
    generating a negative hint that is specific to a specific combination of the second query block and the transformation by including into the negative hint at least the identifier and information pertaining to the transformation that produces the error when applied to the second query block having the identifier during the compilation; and
    avoiding subsequent occurrence of the error during a subsequent compilation on the second query block at least by using the negative hint to prevent the transformation from being applied to one or more query blocks comprising the identifier during the subsequent compilation, wherein the subsequent compilation transforms the first query block.

2. The method of claim 1, further comprising:
performing a verification that determines whether using the negative hint successfully resolves the error in the subsequent compilation, wherein the negative hint is included within a SQL patch.

3. The method of claim 1, further comprising identifying the second query block in the negative hint using the identifier; and deterministically generating the identifier using a hash function, wherein the identifier is unique based at least in part on the transformation in that the identifier changes to a different identifier when the transformation is applied to successfully transform the second query block.

4. The method of claim 1, wherein executions of the first and the second query blocks respectively create a first database view and a second database view of a database table, and the transformation merges the first database view and the second database view.

5. The method of claim 1, wherein performing the subsequent compilation on the second query block occurs when the one or more query blocks access data in a database at the database server, the compilation differs from the subsequent compilation, and the transformation rewrites at least a portion of the second query block.

6. The method of claim 1, wherein the negative hint disables a specific state for the transformation, the transformation corresponds to a group-by transformation, the error corresponds to an incorrectly operable code produced by the database server during the compilation, and the specific state corresponds to a placement of one or more tables into one or more group-by views.

7. The method of claim 1, further comprising:
determining that the negative hint does not resolve the error; and
after determining that the negative hint does not resolve the error, then performing at least one of (a) disabling the transformation; (b) disabling cost-based query transformations; or (c) disabling features of the database server associated with specific one or more versions of the database server.

8. A system, comprising:
a processor;
a memory for holding programmable code; and
wherein the programmable code includes instructions which, when executed by the processor, causes the processor to perform a set of acts, the set of acts comprising:
performing a compilation on a database query at a database server to transform at least a first query block and a second query block in the database query; and
in response to the compilation on the database query,
    detecting an error that occurred during the compilation of the database query;
    upon detection of the error, determining a transformation which, when applied to the second query block during the compilation, causes the database server to produce the error during the compilation;
    determining an identifier for the second query block that causes the error during the compilation;
    generating a negative hint that is specific to a specific combination of the second query block and the transformation by including into the negative hint at least the identifier and information pertaining to the transformation that produces the error when applied to the second query block having the identifier during the compilation; and
avoiding subsequent occurrence of the error during a subsequent compilation on the second query block at least by using the negative hint to prevent the transformation from being applied to one or more query blocks comprising the identifier during the subsequent compilation, wherein the subsequent compilation transforms the first query block.

9. The system of claim 8, wherein the programmable code further includes the instructions which, when executed by the processor, causes the processor to perform the set of acts, the set of acts further comprising:
performing a verification that determines whether using the negative hint successfully resolves the error in the subsequent compilation, wherein the negative hint is included within a SQL patch.

10. The system of claim 8, wherein the instructions further perform identifying the second query block in the negative hint using the identifier; and deterministically generating the identifier using a hash function, wherein the identifier is unique based at least in part on the transformation in that the identifier changes to a different identifier when the transformation is applied to successfully transform the second query block.

11. The system of claim 10, wherein executions of the first and the second query blocks respectively create a first database view and a second database view of a database table, and the transformation merges the first database view and the second database view.

12. The system of claim 8, wherein performing the subsequent compilation on the second query block occurs when the one or more query blocks access accesses data in a database at the database server, the compilation differs from the subsequent compilation, and the transformation rewrites at least a portion of the second query block.

13. The system of claim 8, wherein the negative hint disables a specific state for the transformation, and the transformation corresponds to a group-by transformation, the error corresponds to an incorrectly operable code produced by the database server during the compilation, and the specific state corresponds to a placement of one or more tables into one or more group-by views.

14. The system of claim 8, wherein the instructions further perform:
determining that the negative hint does not resolve the error; and
after determining that the negative hint does not resolve the error, then performing at least one of (a) disabling the transformation; (b) disabling cost-based query transformations; or (c) disabling features of the database server associated with specific one or more versions of the database server.

15. A computer program product embodied on a non-transitory computer readable medium, the non-transitory computer readable medium having stored thereon a sequence of instructions which, when executed by a processor, causes the processor to perform a set of acts, the set of acts comprising:
performing a compilation on a database query at a database server to transform at least a first query block and a second query block in the database query; and
in response to the compilation on the database query,
detecting an error that occurred during the compilation of the database query;
upon detection of the error, determining a transformation which, when applied to the second query block during the compilation, causes the database server to produce the error during the compilation;
determining an identifier for the second query block that causes the error during the compilation;
generating a negative hint that is specific to a specific combination of the second query block and the transformation by including into the negative hint at least the identifier and information pertaining to the transformation that produces the error when applied to the second query block having the identifier during the compilation; and
avoiding subsequent occurrence of the error during a subsequent compilation on the second query block at least by using the negative hint to prevent the transformation from being applied to one or more query blocks comprising the identifier during the subsequent compilation, wherein the subsequent compilation transforms the first query block.

16. The computer program product of claim 15, wherein the non-transitory computer readable medium further includes the sequence of instructions which, when executed by the processor, causes the processor to perform the set of acts, the set of acts further comprising:
performing a verification that determines whether using the negative hint successfully resolves the error in the subsequent compilation, wherein the negative hint is included within a SQL patch.

17. The computer program product of claim 15, wherein the sequence of instructions further performs identifying the second query block in the negative hint using the identifier and deterministically generating the identifier-using a hash function, wherein the identifier is unique based at least in part on the transformation in that the identifier changes to a different identifier when the transformation is applied to successfully transform the second query block.

18. The computer program product of claim 15, wherein executions of the first and the second query blocks respectively create a first database view and a second database view of a database table, and the transformation merges the first database view and the second database view.

19. The computer program product of claim 15, wherein performing the compilation on the second query block occurs when the one or more query blocks access data within a database table at the database server, the compilation differs from the subsequent compilation, and the transformation rewrites at least a portion of the second query block.

20. The computer program product of claim 15, wherein the negative hint disables a specific state for the transformation, and the transformation corresponds to a group-by transformation, the error corresponds to an incorrectly operable code produced by the database server during the compilation, and the specific state corresponds to a placement of one or more tables into one or more group-by views.

21. The computer program product of claim 15, wherein the sequence of instructions further performs:
determining that the negative hint does not resolve the error; and
after determining that the negative hint does not resolve the error, then performing at least one of (a) disabling the transformation; (b) disabling cost-based query transformations; or (c) disabling features of the database server associated with specific one or more versions of the database server.

22. A method, comprising:
performing a compilation on a database query at a database server to transform at least a first query block and a second query block in the database query; and
in response to the compilation on the database query,
detecting an error that occurred during the compilation of the database query;
upon detection of the error, determining a transformation as a possible cause for the error that occurred during the compilation of the second query block in the database query, wherein the error corresponds to the compilation that applies the transformation to the second query block during the compilation;

determining an identifier for the second query block that causes the error during the compilation;
generating a hint that is specific to a specific combination of the second block and the transformation by including into the hint at least the identifier and information pertaining to the transformation that produces the error when applied to the second query block having the identifier during the compilation; and
avoiding subsequent occurrence of the error during a subsequent compilation on the second query block in the database query, wherein the subsequent compilation successfully transforms at least the first query block but uses the hint to affect application of the transformation to one or more query blocks comprising the identifier during the subsequent compilation that occurs after the compilation.

23. The method of claim 22, further comprising performing a verification that determines whether using the negative hint successfully resolves the error in the subsequent compilation, wherein the hint is implemented as a SQL patch.

24. The method of claim 22, wherein
performing the subsequent compilation occurs when the one or more query blocks access data in a database at the database server,
the compilation differs from the subsequent compilation,
the hint corresponds to a negative hint that is specific to the specific combination of the second query block and the transformation, and
the database query is recompiled during the subsequent compilation such that the negative hint prevents the specific combination of the second query block and the transformation from being used during the subsequent compilation.

25. A system, comprising:
a processor;
a memory for holding programmable code; and
wherein the programmable code includes instructions for:
performing a compilation on a database query at a database server to transform at least a first query block and a second query block in the database query; and
in response to the compilation on the database query,
detecting an error that occurred during compilation of the database query;
upon detection of the error, determining a transformation as a possible cause for the error that occurred during the compilation of the second query block in the database query, wherein the error corresponds to the compilation that applies the transformation to the second query block during the compilation;
determining an identifier for the second query block that causes the error during the compilation;
generating a hint that is specific to a specific combination of the second query block and the transformation by including into the hint at least the identifier and information pertaining the transformation that produces the error when applied to the second query block having the identifier during the compilation; and
avoiding subsequent occurrence of the error during a subsequent compilation on the second query block in the database query, wherein the subsequent compilation successfully transforms at least the first query block but uses the hint to affect application of the transformation to one or more query blocks during the subsequent compilation that occurs after the compilation.

26. The system of claim 25, the set of acts further comprising performing a verification that determines whether using the hint successfully resolves the error in the subsequent compilation, wherein the hint is implemented as a SQL patch.

27. The system of claim 25, wherein
performing the subsequent compilation occurs when the one or more query blocks access data in a database at the database server,
the compilation differs from the subsequent compilation,
the hint corresponds to a negative hint that is specific to the specific combination of the second query block and the transformation, and
the database query is recompiled during the subsequent compilation such that the negative hint prevents the specific combination of the second query block and the transformation from being used during the subsequent compilation.

28. A computer program product embodied on a non-transitory computer readable medium, the non-transitory computer readable medium having stored thereon a sequence of instructions which, when executed by a processor, causes the processor to perform a set of acts, the set of acts further comprising:
performing a compilation on a database query at a database server to transform at least a first query block and a second query block in the database query; and
in response to the compilation on the database query,
detecting an error that occurred during compilation of the database query;
upon detection of the error, determining a transformation as a possible cause for the error that occurred during the compilation of the second query block in the database query, wherein the error corresponds to the compilation that applies the transformation to the second query block during the compilation;
determining an identifier for the second query block that causes the error during the compilation;
generating a hint that is specific to a specific combination of the second block and the transformation by including into the hint at least the identifier and information pertaining to the transformation that produces the error when applied to the second query block having the identifier during the compilation; and
avoiding subsequent occurrence of the error during a subsequent compilation on the second query block in the database query, wherein the subsequent compilation successfully transforms at least the first query block but uses the hint to affect application of the transformation to one or more query block comprising the identifier during the subsequent compilation that occurs after the compilation.

29. The computer program product of claim 28, the set of acts further comprising performing a verification that determines whether using the hint successfully resolves the error in the subsequent compilation, wherein the hint is implemented as a SQL patch.

30. The computer program product of claim 28, wherein
performing the subsequent compilation occurs when the one or more query blocks access data in a database at the database server,
the compilation differs from the subsequent compilation,
the hint corresponds to a negative hint that is specific to the specific combination of the second query block and the transformation, and the database query is recompiled during the subsequent compilation such that the negative hint prevents the specific combination of the second query block and the transformation from being used during the subsequent compilation.

* * * * *